Patented Sept. 3, 1935

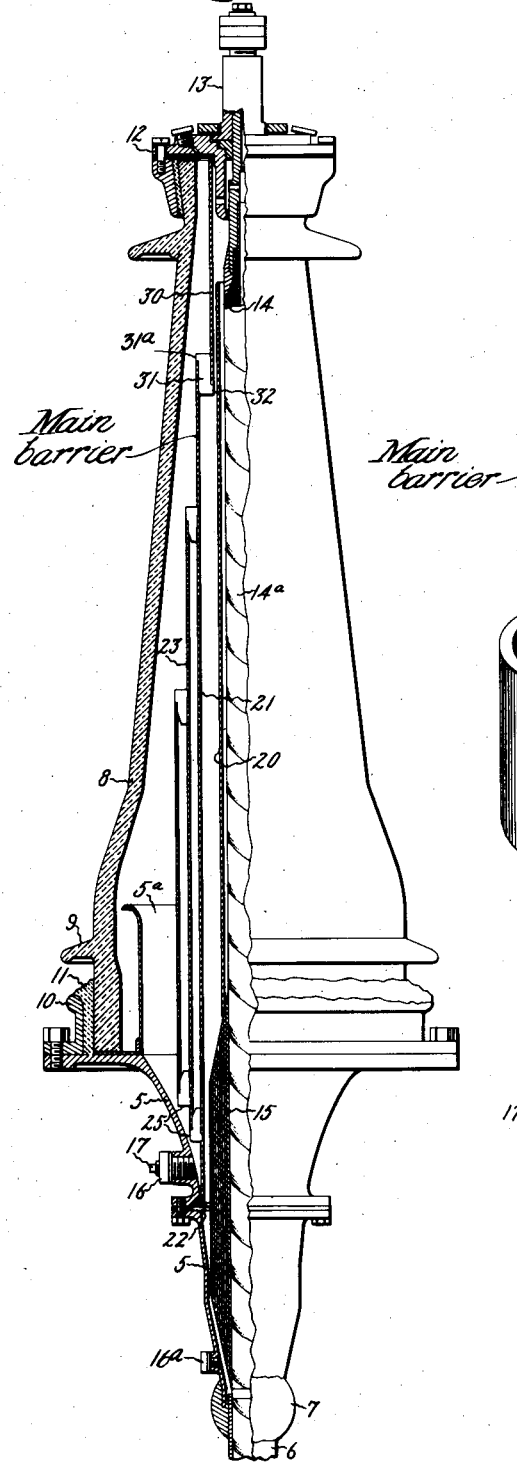

2,013,537

UNITED STATES PATENT OFFICE 2,013,537

TERMINAL FOR ELECTRIC CONDUCTORS

Eugene D. Eby, Pittsfield, Mass., assignor to General Electric Company, a corporation of New York Application January 15, 1932, Serial No. 586,879

5 Claims. (Cl. 173—353)

The present invention relates to terminal and joint members for cables adapted to transmit electric current at high potentials, and has for its object the provision of an improved construction whereby the parts thereof may readily be assembled to form a unitary structure at the place of manufacture or at the point of installation, and in which for electrical reasons the various insulating parts should be accurately located one with respect to the other.

For a consideration of what I believe to be novel and my invention, attention is directed to the accompanying description and the claims appended thereto.

In the attached drawing Fig. 1 is a view partly in elevation and partly in section of a cable terminal, and which may also be considered as representing a part of a cable joint; Fig. 2 is a perspective view of parts of a pair of barriers; Fig. 3 is a detail view of the lower part of the terminal, and Fig. 4 is a perspective view of one of the combined spacing and supporting blocks.

5 indicates a metal sleeve the lower end of which is connected to the lead sheath 6 of a cable by a wiped soldered joint 7. The sleeve is made in two parts, an upper and a lower, and gradually flares upwardly and outwardly to properly distribute electrical stresses. Mounted on the flanged upper end of the sleeve is an insulator 8 of any suitable construction, such as porcelain. It may have a smooth exterior or be provided with numerous annular parallel projections 9. Terminals usually have a considerable number of these projections while cable joints do not. The insulator is held in place in the usual manner by a bolting ring 10 and a body of cement 11 which in conjunction with a gasket at the lower end of the insulator form a fluid-tight connection. Situated between the lower end of the insulator and the cable and supported by the wiping sleeve is a metal cylinder 5ª that assists in distributing the electrical stresses to which the terminal insulation is subjected. Mounted on top of the insulator is a metal cap 12 on which is located a metallic member 13 affording a means for connecting the cable to another conductor. The cap is secured in a manner similar to the anchoring means of the lower end of the insulator.

The cable 14 may be of the solid or cored type, the latter being shown. The interior of the cable or core is filled with fluid insulation, such as thin oil as is also the chamber within the insulator. Surrounding the conductor is the factory applied insulation 14ª. At the lower end of the cable is applied a reinforcement in the form of wrapped on tape or equivalent material 15. To admit oil or other fluid insulation to the interior of the enclosing casing formed by the metal and insulating parts, the metal casing is provided with two or more openings which are normally closed by screw threaded plugs 16 and 16ª. One of the plugs such as 16 is provided with a pipe 17 by means of which the interior of the casing may be connected to a feeding reservoir containing oil or other insulating fluid.

Between the conductor or cable end and the insulator 8 are located cylindrical barriers. The use of barriers as insulators is old and well known as are the other parts of the structure previously described. My invention resides in the way these barriers are supported and assembled.

A structure of this character usually has to be installed in the field where the facilities are not as good as at the factory and where the danger of improper assembly is greater. Once the parts are completely assembled inspection of the interior parts is impossible, hence the importance of so arranging the parts that they can only be assembled in one and the proper way.

The number of barriers will depend upon the voltage to which the cable and terminal and joint are subjected. As shown four such barriers are provided, each of which is composed of a high grade insulating material, as for example fibrous material in sheet form, the turns of which are firmly united by a binder under pressure. The inner barrier 20 being of a diameter only slightly larger than the insulation on the cable is slipped over the end of the cable and rests on the reinforcement. It may, however, be united with the other barriers by the means hereinafter described. The next outer barrier 21, termed the main barrier because it sustains the weight of the others, is supported at its lower end on an insulating washer 22, Figs. 1 and 3, which is secured, as by screws, to one of the members of the wiping sleeves 5. To support the next outer barrier 23 the main barrier 21 is provided with equally spaced narrow shallow recesses 24 intermediate between its ends of which at least three should be provided in order to hold the two cylindrical barriers in concentric relation as will appear later. I find, however, that four such recesses are desirable spaced 90° apart and located in the same transverse plane. The main barrier 21 is also provided with a second set of recesses near its lower end to receive the spacing blocks for the lower end of barrier 23, see Fig. 3. To connect the barriers and also space them apart, insulating blocks 25 are employed which are or may be made of the same material as the barriers. Each block has a narrow shoulder or projection 26 Fig. 4, of a size and shape to fit a recess 24 and a second shoulder or projection 27 of a size and shape to fit a notch 28 in a barrier. The notches 28 are shown as extending entirely through the barriers as such an arrangement is a simple machine operation, but if desired they may extend only part way through, resembling in this respect the recesses 24. However made, they form receiving means for the projections or shoulders on the blocks. The block is also provided with a portion 29 which acts as a spacing means and also affords a suitable bearing surface. The cylinders are sufficiently elastic or yieldable to permit of the spacing blocks being slipped into place by slightly deforming the barrier. After the deforming pressure is removed the barrier springs back to its original shape. It will be observed that at the top of each barrier the tapered end of supporting and spacing block is directed downwardly while those at the bottom end of the barrier are in the reverse position with the tapered end directed upwardly. Each of the other and outer barriers is similarly constructed and supported in the same manner. For electrical reasons the outer barriers need not be so long as the inner barrier. In other words, the barriers are progressively shorter from the cable outwardly. The uppermost barrier 30 is a short one and forms in effect a continuation of the main barrier 21, and for that reason is termed a secondary barrier. In this case because the diameter of the insulator 8 is smaller at the top than at the bottom, the barrier is smaller in diameter and extends inside of the main barrier 21. Its supporting blocks 31 are constructed in a slightly different manner from those previously described. Each has a shoulder 31ª that enters a slot or notch 31ᵇ in the upper end of the main barrier 21 and a shoulder or projection 32 which enters a corresponding notch in the lower end of said uppermost barrier 30. In this case the weight of said barrier 30 is sustained by the blocks 31 and these are in turn supported by the longest or main barrier 21 which is supported by the washer or ring 22.

Owing to the construction described, the barriers may be made and assembled in the factory into a single unit and thereafter sent to the point of installation where they may be installed as a unit, thereby avoiding independent handling of the parts and the possibility of incorrect assembly in spacing, or both. This statement does not apply to the innermost or small diameter barrier 20 which is or may be independently mounted in place since it does not require supporting blocks as it rests on the reinforcement. It may however be otherwise supported. By the use of supporting and spacing blocks as described the barriers can be separated one from the other by first deforming the outer barrier and then removing the block one by one after which the other barriers may be separated in the same manner. It is to be noted that no fastening screws or pins are employed which simplifies the procedure both in assembling and disassembling the parts, that the interlocking of the shoulders in the notches and recesses suffices to retain the barriers in their proper positions both as regards the axis of the terminal and their vertical positions thereon, and that the natural elasticity or yieldability of the barriers suffices to hold the blocks in place. The spaces between the barriers afford ample free space for the insulating fluid. The supporting and spacing blocks are also useful in holding the cylinder in locked positions one with respect to another while being transported.

The invention has been described in connection with a cable terminal but it may be used in cable joint structures where it is desired to preserve concentric relation of the barriers in a simple effective manner. The structure shown may in certain respects be regarded as illustrating one half of a fluid stop joint.

What I claim as new and desire to secure by Letters Patent of the United States, is:

1. The combination of a sheathed cable, a deformable cylindrical insulating barrier surrounding the cable and provided with recesses, a divided wiping sleeve secure to the sheath, means located between the parts of the sleeve forming a support for the lower end of the barrier, a second barrier surrounding the first, and also provided with recesses, spacing blocks having shoulders on opposite sides entering the recesses of both barriers for holding them in concentric interlocked relation and also transmitting the weight of the second barrier to the first, a chambered insulator enclosing the barriers and supported by the sleeve, the wall thereof being spaced from the barriers, and a terminal cap for the cable supported by the insulator.

2. In a cable terminal, the combination of a vertically disposed sheathed cable, a plurality of concentric, deformable insulating barriers surrounding the cable, each having recesses, a divided wiping sleeve secured to the sheath, an annular member located at the joint between parts of the sleeve and forming a support upon which the lower end of one of the barriers rest, and spacing blocks located between the barriers to hold them in concentric relation, said blocks being angularly displaced, certain of them having shoulders on one end and others at both ends, the shouldered portions entering the recesses in the barriers for transmitting the weight of all the barriers to the one which is supported at the lower end on said member and also for holding the barriers in interlocked concentric relation.

3. In a structure of the character described, the combination of a cable, a sleeve fastened thereto, a chambered insulator supported by the sleeve, an end cap for the insulator, a long cylindrical barrier of insulating material located inside the chambered insulator and having angularly spaced notches in one end, a short cylindrical barrier of insulating material having one end located within the notched end of the long barrier, spacking blocks located in the notches in the long barrier and engaging the lower end of the short barrier to support it, and means carried by the sleeve for supporting both of the barriers.

4. In a cable terminal, the combination of a sheathed cable, a wiping sleeve secured to the sheath of the cable, an insulator supported by the sleeve which is smaller at the outer end than at the base, a terminal cap supported by the small end of the insulator and connected to the conductor of the cable, a main cylindrical barrier of insulating material supported at one end by the wiping sleeve, said barrier having spaced notches in its outer end and spaced recesses in its wall, a secondary cylindrical barrier of insulation of smaller diameter located within the outer end of the main barrier and extending beyond it into the terminal cap and enclosing parts thereof, the secondary barrier having spaced notches in its inner end, supporting and spacing means for the secondary barrier comprising blocks, each block having a shouldered portion at its outer end seated in a notch in the main barrier and a shouldered portion at its inner end seated in a notch in the inner end of the secondary barrier, other and concentric barriers surrounding the main barrier, and supporting blocks therefor, said blocks interlocking with the several barriers so that the weight thereof is transmitted to and supported by the main barrier.

5. In a structure of the character described, the combination of a cable, a metallic end cap therefor, a metallic base secured to the cable, an insulator supported by the cap and base, concentric cylindrical barriers surrounding the cable and located within the insulator, said barriers having thin walls of insulating material which are deformable in a direction perpendicular to their common axis and which contain shallow angularly spaced narrow recesses and similarly spaced narrow end notches, insulating blocks each having radially projecting shoulders one of which enters a recess in one barrier and the other an end notch in an adjacent barrier, the bodies of the several blocks acting as spacers to hold the barriers in concentric relation, the thickness of said shoulders being less than the permissible deformation of a pair of adjacent barriers, and a secondary barrier supported at its lower end through blocks by one of the other barriers and freely surrounding a part of the metal end cap at its upper end.

EUGENE D. EBY.